United States Patent [19]

Sheppard, Jr.

[11] 4,103,928
[45] Aug. 1, 1978

[54] ADJUSTABLE TRAILER HITCH WITH INTERCHANGEABLE CONNECTING MEANS

[76] Inventor: Walter R. Sheppard, Jr., P.O. Box 797, Fletcher, N.C. 28732

[21] Appl. No.: 769,922

[22] Filed: Feb. 18, 1977

[51] Int. Cl.² .............................................. B60D 1/16
[52] U.S. Cl. .............................. 280/490 R; 280/415 A
[58] Field of Search ............... 280/415 A, 490 R, 511, 280/512, 513, 514, 515

[56] References Cited

U.S. PATENT DOCUMENTS

| 2,127,913 | 8/1938 | Graham | 280/512 X |
|---|---|---|---|
| 3,035,856 | 5/1962 | Mleczko | 280/490 R |
| 3,393,924 | 7/1968 | Silver | 280/515 X |
| 3,554,578 | 1/1971 | Reed | 280/490 R |
| 3,708,183 | 1/1973 | Jones | 280/490 R X |
| 3,790,192 | 2/1974 | Green | 280/511 |
| 3,865,406 | 2/1975 | Dutton | 280/490 R |
| 3,963,264 | 6/1976 | Down | 280/415 A |

*Primary Examiner*—Joseph F. Peters, Jr.
*Assistant Examiner*—R. Schrecengost
*Attorney, Agent, or Firm*—Jones, Thomas & Askew

[57] ABSTRACT

An adjustable trailer hitch includes a mounting plate for attaching the trailer hitch to a traction vehicle, a slide plate movable up and down with respect to the mounting plate by means of a jack screw, and a tongue extending from the slide plate. The tongue includes a hole to receive a shank of a removable hitch member, and a removable pin secures the shank of the hitch member within the hole.

3 Claims, 4 Drawing Figures

U.S. Patent   Aug. 1, 1978   4,103,928
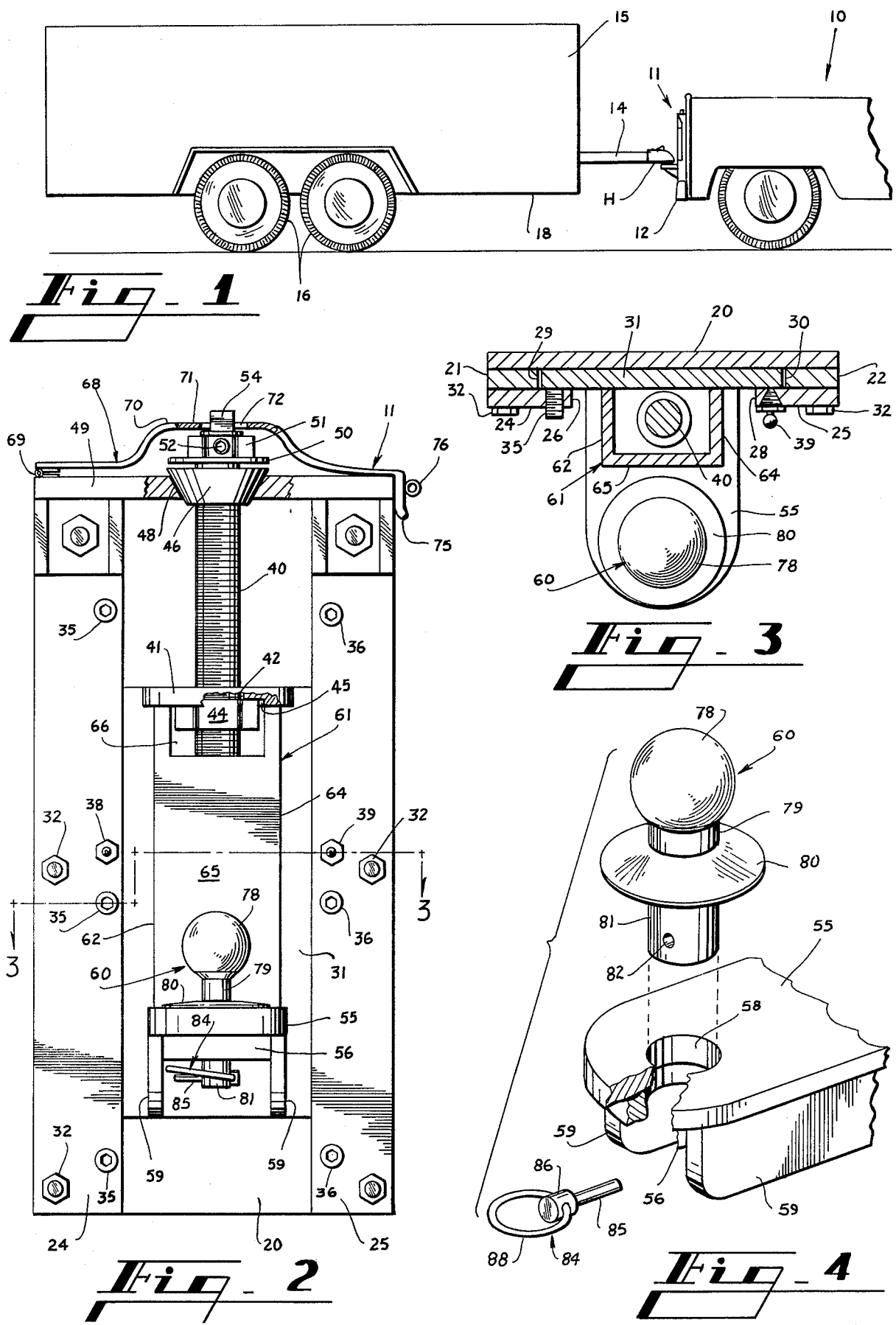

ADJUSTABLE TRAILER HITCH WITH INTERCHANGEABLE CONNECTING MEANS

BACKGROUND OF THE INVENTION

This invention relates to hitching apparatus and the like, and is more particularly concerned with an adjustable trailer hitch having an interchangeable connecting means for connection to various size trailers, particularly to mobile homes.

In the mobile home industry, there are various sizes and designs of mobile dwellings and the purchasers, and therefore the manufacturers are most concerned with the construction of the home as it relates to daily living as opposed to the portion of the construction as it relates to movement between dwelling sites. As a result, there is no standardization in the mobile home industry as to trailer height, weight, weight distribution, hitch height or hitch size, and the towing or traction vehicle must conform to the particular towing requirements of a mobile home which is to be moved.

To make possible the use of a single vehicle to tow a variety of trailers, the usual arrangement has been to have a hitch ball that is bolted to a hitch tongue so the hitch ball can possibly be removed and replaced with the appropriate size ball. In practice, however, the threaded bolt portion of the hitch ball becomes corroded so that it frequently must be cut off, thereby destroying the hitch ball. The tongue on which the hitch member is carried usually is a size which might fit trailers of different sizes, heights, etc. Thus, the tongue construction of the towing assembly of the traction vehicle usually has been selected on the basis of the most frequently towed trailer and it usually is poorly designed for different trailers.

The proper height position of the hitch of the traction vehicle with respect to the towed vehicle is important in view of the fact that the weight distribution on each of the axles is an important factor in the safe movement of the trailer. The leveling of the trailer will cause the weight to be equal on all axles. When the hitch is too low or too high it will put a larger amount of the load on the front axle or on the back axle respectively, creating hazards of blowing out tires, swerving and trailer instability when being towed.

SUMMARY OF THE INVENTION

The present invention overcomes the above mentioned and other difficulties with the prior art trailer hitches by providing an adjustable trailer hitch having a tongue carried by a slide plate, screw means operable to raise or lower the slide plate, and means of fixing the slide plate in a selected position. The trailer hitch also includes a box arranged to reinforce the structure of the device and to provide protection for the screw means. Additionally, the tongue carries a selectively removable hitch ball or other type hitch member carried by socket means that provides sufficient strength for the hitch member, and releasible means for retaining the hitch member within the socket. Due to the provision of a selectively movable tongue, the apparatus of the present invention is also usable as a lifting apparatus convenient for setting up trailers and the like.

Thus, it is an object of this invention to provide an adjustable hitch for mobile homes and other trailers which is inexpensive to manufacture, which can be used with different types and sizes of trailers, and which is convenient, safe and expedient to operate.

These and other objects, features and advantages of the present invention will become apparent from consideration of the following specification when taken in conjunction with the accompanying drawings.

BRIEF DESCRIPTION OF THE DRAWINGS

FIG. 1 is a side elevational view showing a portion of a traction vehicle having a trailer hitch made in accordance with the present invention mounted thereon and showing a trailer hitched thereto;

FIG. 2 is a front elevational view, partially broken away, of a trailer hitch made in accordance with the present invention as shown in FIG. 1;

FIG. 3 is a cross-sectional view taken substantially along the line 3—3 in FIG. 2; and, FIG. 4 is a perspective view partly in cross-section, showing the details of the tongue and the associated hitch member.

DETAILED DESCRIPTION

Referring now more particularly to the drawings and to that embodiment of the invention here chosen by way of illustration, FIG. 1 shows a towing or traction vehicle 10 of a conventional type and hitch means H including trailer hitch 11 fixed to the rear of the vehicle specifically designed to tow mobile homes and other large trailers and the like as illustrated at 15. It will be understood that, in practice, various forms of structure, reinforcements, struts or the like may be required to fix the trailer hitch 11 to the vehicle 10; however, for simplicity of illustration it is here assumed that the vehicle 10 has a back plate 12 already suited for the attachment of the trailer hitch 11.

As shown in FIG. 1, trailer 15 includes a framework (not shown) which includes wheels 16 and tongue 14. It will be understood that, as the tongue 14 is raised or lowered, the trailer 15 will pivot about the axles of the wheels 16 so that the trailer 15 will rest on the forward wheels if the tongue is too low, on the rear wheels if the tongue is too high, or on all wheels if the tongue is at the proper level. Hitch means H is movable up or down with respect to the traction vehicle 10, so the trailer 15 can be positioned parallel to the road and resting equally on all of its wheels.

As illustrated in FIGS. 2 and 3 of the drawings, trailer hitch 11 includes a backing plate 20 which serves as a mounting plate for the trailer hitch 11. The backing plate 20 is welded, bolted or otherwise rigidly connected to the rear plate 12 of the vehicle 10. A pair of spacer plates 21 and 22 are rigidly connected to the backing plate 20 parallel to each other along opposite sides of the backing plate and a pair of face plates 24 and 25 are connected to the spacer plates 21 and 22. As best seen in FIG. 3 of the drawings, the spacer plate 21 and 22 have their outer edges aligned with the edges of the backing plate 20, and the face plates 24 and 25 have their outer edges aligned with the outer edges of the spacer plates 21 and 22 while their inner edges 26 and 28 define overlapping lips to provide a pair of channels 29 and 30 for receiving the slide plate 31.

A plurality of screws or the like 32 secure the spacer plates 21 and face plate 24 to the backing plate 20, and a plurality of screws or the like 34 secure the spacer plate 22 and the face plate 25 to the backing plate 20 and these plates together function as a mounting plate for the slide plate 31.

To lock the vertically slidable plate 31 in a fixed position, set screws 35 and 36 threadedly engage the face plates 24 and 25 and are positioned at the overlapping edge portions of the face plates and the slide plate 31 to contact the edges of the slide plate. When the set screws 35 and 36 are screwed in, they will contact the slide plate 31 to hold it in place as desired.

Since the slide plate 31 must move vertically with respect to the mounting when desired, a pair of grease fittings 38 and 39 are positioned at the overlapping edges of the face plates 24 and 25 and the slide plates 31. The grease fittings 38 and 39 are conventional fittings adapted to receive the nozzle of a grease gun so grease can be injected into the channels 29 and 30.

Externally threaded jackscrew 40 is disposed parallel to the slide plate 31 and generally centrally located between the two face plates 24 and 25. Traveller plate 41 is rigidly connected to the upper portion of slide plate 31 and hole 42 is formed therein. Jackscrew 40 passes through hole 41 and traveller nut 44 is rigidly connected to traveller plate 41 at hole 42 and includes internal threads that engage the external threads of the jackscrew 40. The traveller plate 41 has the area surrounding the hole 42 recessed to receive the traveller nut 44, it being understood that the recess 45 is of the same shape as the traveller nut 44 so that the nut is held against rotation when the jackscrew 40 is rotated.

The upper end of the jackscrew 40 is received within a bearing 46, the bearing 46 being held within an opening 48 in a top plate 49 so that the outer race of the bearing 46 is held stationary. A flat washer 50 surrounds the jackscrew 40 adjacent bearing 46, and a nut 51 threadedly engages the jackscrew 40 and bears against the washer 51. A pin 52 passes through the nut 51 and the jackscrew 40 to prevent rotation of the nut 51 with respect to the jackscrew 40 after the apparatus has been assembled. The uppermost end 54 of the jackscrew 40 is shaped to receive a wrench or other turning means. The end 54 is here shown as square, but of course any convenient shape may be used. The nut 51 will rotate with the jackscrew 40 because it is pinned by the pin 52; and, rotation is made easier by the fact that the nut 51 is resting on a washer 50 which in turn rests on the bearing 46. Since the traveller nut 44 is held against rotation by being within the recess 45, the nut 44 will move axially of the jackscrew 40 as the jackscrew 40 rotates within the traveller nut 44. Since the traveller plate 41 is fixed to the slide plate 31, the plate 31 will also move as the jackscrew 40 is rotated.

The lower end of slide plate 31 carries an outwardly extending tongue 55 which includes socket 58 for receiving the hitch ball 60 or other member. Tongue 55 has a reinforcing member 56 on the bottom thereof to provide greater thickness and additional strength in the tongue 55 and in the socket 58. Each side of the tongue 55 has a depending skirt 59 which assists in fixing the tongue to the slide plate 31 and adds to the strength of the tongue 55.

As illustrated in FIG. 4, socket 58 comprises a hole through both the tongue 55 and the reinforcing member 56, the holes being concentric and of the same size. The socket 58 is adapted to receive the hitch ball 60 as will be discussed in detail later.

Jackscrew 40 extends along the slide plate 31 which is behind the hitch member 60. Since trailer tongue 14 will be coupled to and uncoupled from the hitch member 60 in this vicinity, it is important to have some protection for the jackscrew 40. If the jackscrew becomes bent, or the threads become mutilated, the apparatus will not operate properly. Thus, for protection of the jackscrew 40, box 61 extends from the tongue 55 to the traveller plate 41.

Box 61 includes parallel side walls 62 and 64 connected along their side edges to slide plate 31 and front wall 65, and box 61 extends from the tongue 55 up to the traveller plate 41. The side walls 62 and 64 of box 61 are welded or otherwise firmly fixed at their lower ends to tongue 55, at their upper ends to traveller plate 41, and along their sides to slide plate 31. Thus, the box 61 has the dual function of protecting the jackscrew 40 and of strengthening the structure. Front wall 65 of box 61 stops short of the traveller plate 41 to provide an access opening 66 so the traveller nut 44 can be removed and replaced when desired.

Holding plate 68 is hinged to the top plate 49 by a hinge 69. Holding plate 68 has an off-set 70 central portion which extends over the upper end of jackscrew 40 which includes a slot 72. Holding plate 68 terminates in a lip 75 that receives a pin 76 to prevent motion of the plate 68 about the hinge 69. Slot 72 is formed in the off-set central portion 70 of holding plate 68 and has a width generally equal to the width of the square end 54 of jackscrew 40 so the end 54 can be rotated to be aligned with the slot 72, then the plate 68 can be moved down to the position shown in the drawings with the end 54 projecting through the slot 72. Once the pin 76 is placed through the lip 75, the plate 68 cannot move to allow the end 54 to rotate.

Hitch member 60 includes a ball 78 which comprises a connecting means for the trailer 15. The ball 78 is mounted on a column 79 which connects to a flange 80. Beneath the flange 80 is a mounting shank 81 that is concentric with the column 79. Mounting shank 81 has a diametrical hole 82 extending therethrough for receiving a locking pin 84. Locking pin 84 comprises a stem 85 and a head 86 through which a ring 88 passes. The ring 88 of locking pin 84 is sufficiently large that, once the stem 85 is inserted through the hole 82, the ring 88 can be pivoted around to the position shown in FIG. 2, and the ring has an inherent spring tension that holds the ring in place. The outside diameter of shank 81 and the inside diameter of socket 58 are approximately the same so that the shank can be tapped into or out of the socket and there is very little play between them.

From the foregoing it should now be understood that the trailer hitch 11 of the present invention would be installed on a vehicle 10 by placing the apparatus in the desired location on the plate 12 of the vehicle 10 and welding the back plate 20 to the plate 12 of the vehicle 10.

When a trailer 15 is to be attached to the trailer hitch 11, a hitch member 60 is selected for a ball 78 of the proper size for the trailer. The hitch member 60 is inserted into the socket 58 and the pin 84 put into place. The jackscrew is rotated to elevate the hitch member to a convenient height for inserting the trailer tongue over the ball. Next, the trailer would be attached to the ball 78 in the conventional manner. The jackscrew 40 is then rotated to move the hitch member until the trailer 15 is level, or in the desired position.

If the trailer is to be moved a distance of any significant length, it is desirable to tighten all of the set screws 35 and 36 that will bear against the slide plate 31 to secure the plate 31 against motion. The locking plate 68 should be pivoted into the position shown to hold the end 54 of jackscrew 40 against rotation.

It is contemplated that the trailer hitch 11 will be mounted so that the lowest position of the tongue 55 will be only a few inches from the ground. Because of this, the apparatus can function as a jack. If necessary, the hitch member 60 can be removed so the flat surface of tongue 55 is available for lifting. This is useful in the mobile home industry because a traction vehicle such as the vehicle 10 will tow the mobile home to the erection site, and the vehicle 10 will be available in setting up mobile homes. To have the apparatus of the present invention available as a jack also is an added advantage.

It will be understood that the embodiment of the invention here shown is by way of illustration only, and is meant to be in no way restrictive; therefore, numerous changes and modifications may be made, and the full use of equivalents resorted to, without departing from the spirit or scope of the invention as defined in the appended claims.

What is claimed is:

1. An adjustable trailer hitch for attaching a trailer to a traction vehicle, said trailer hitch being carried by said traction vehicle and comprising a mounting plate fixed to said traction vehicle, a pair of spacer plates fixed to said mounting plate and parallel to each other, a pair of face plates juxtaposed on said spacer plates and extending beyond said spacer plates for forming a pair of vertically disposed parallel grooves between said face plates and said mounting plate, a slide plate being received within said grooves and movable therein, a top plate at the upper end of said face plates and extending across said mounting plate, a traveller plate fixed to said slide plate, a jackscrew mounted generally parallel to said slide plate, said jackscrew being journaled in said top plate and depending therefrom, a traveller nut engaged with said traveller plate and threadedly engaged with said jackscrew for causing motion of said traveller plate along said jackscrew on rotation of said jackscrew, a tongue carried by said slide plate and extending outwardly therefrom, a socket in said tongue, said hitch member including a shank receivable in said socket, said traveller plate being located generally at the top of said slide plate, said tongue being located generally towards the bottom of said slide plate, and a box extending between said tongue and said traveller plate, said box being fixed to both said tongue and said traveller plate and at least partially enclosing said jackscrew.

2. An adjustable trailer hitch as claimed in claim 1, said jackscrew including a wrench receiving end above said top plate, and means for selectively holding said wrench receiving end to prevent rotation of said jackscrew with respect to said top plate.

3. An adjustable trailer hitch as claimed in claim 2, and including means for selectively fixing the position of said slide plate comprising a plurality of screw means threadedly engaged with said face plates, at least some of said screw means being engageable with said slide plate to secure said slide plate within said grooves.

* * * * *